May 9, 1950 J. S. BELTZ 2,506,988
FEED NUT OPERATING MECHANISM FOR POWER DRILLS
Filed March 28, 1947 2 Sheets-Sheet 1
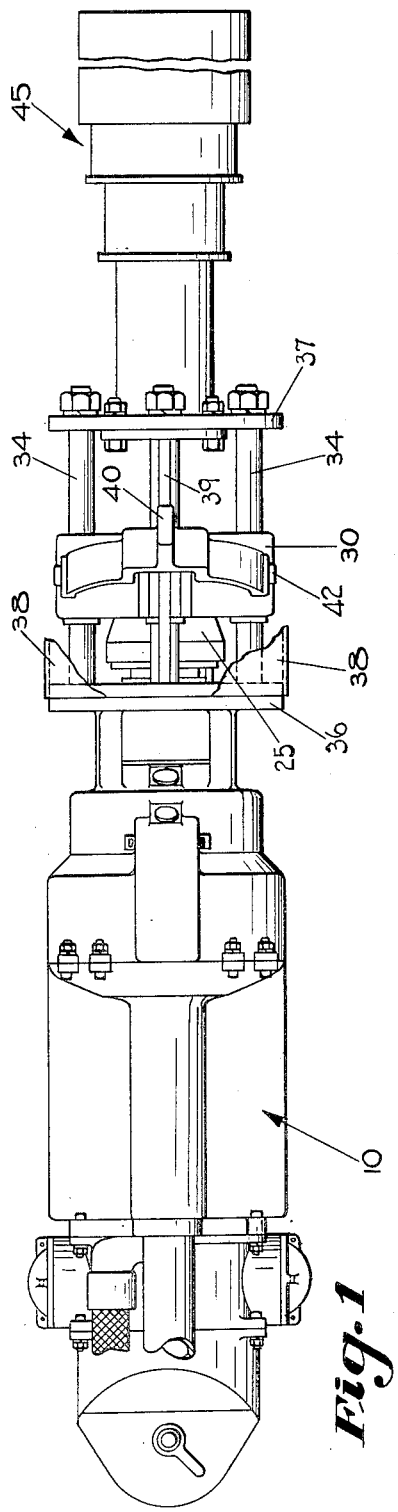
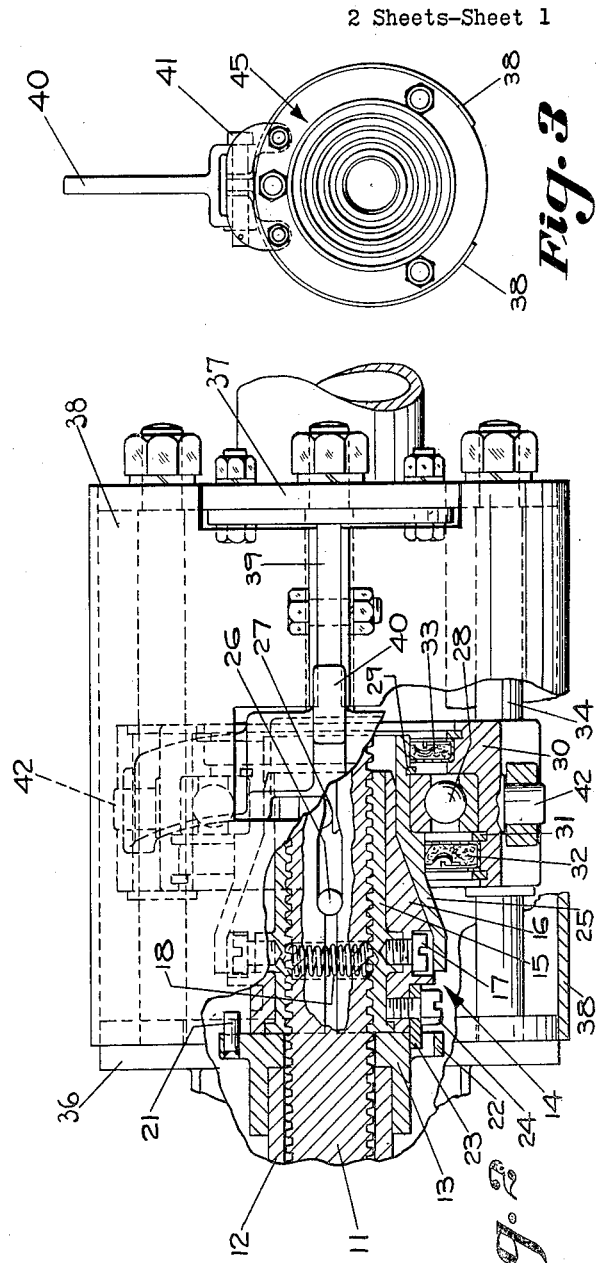
INVENTOR;
JOHN S. BELTZ,
BY
ATTY.

May 9, 1950     J. S. BELTZ     2,506,988
FEED NUT OPERATING MECHANISM FOR POWER DRILLS
Filed March 28, 1947     2 Sheets-Sheet 2
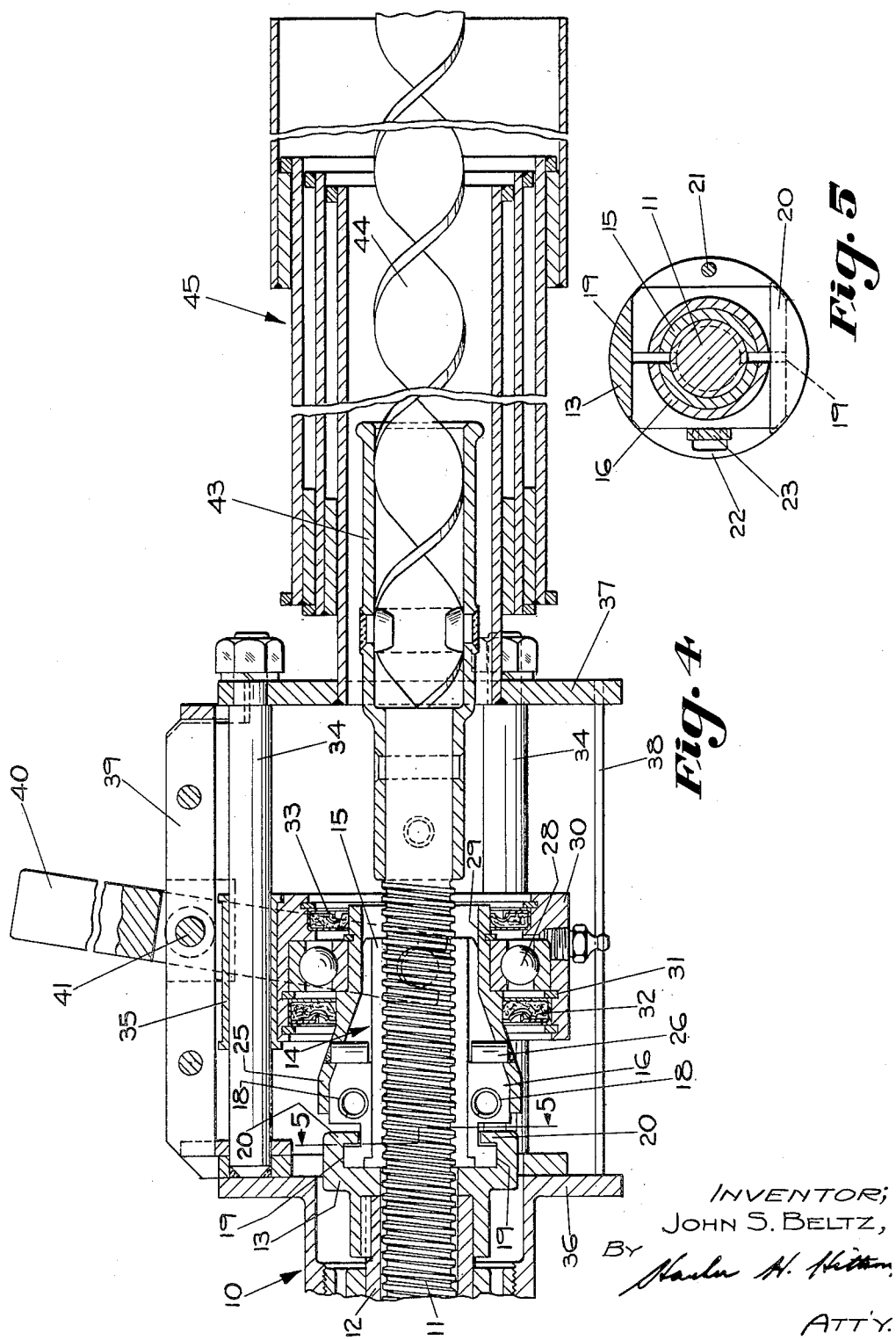
INVENTOR;
JOHN S. BELTZ,
BY
ATT'Y.

Patented May 9, 1950

2,506,988

UNITED STATES PATENT OFFICE 2,506,988

FEED NUT OPERATING MECHANISM FOR POWER DRILLS

John S. Beltz, Columbus, Ohio, assignor to The Jeffrey Manufacturing Company, a corporation of Ohio Application March 28, 1947, Serial No. 737,895

1 Claim. (Cl. 255—45)

This invention relates to an improved feed nut operating mechanism for a power drill, and an object of the invention is to provide an improved device of the above-mentioned type.

A further object of the invention is to provide a device of the above-mentioned type, in which an anti-friction bearing is employed in connection with actuating mechanism for actuating or releasing a split feed nut by an operating handle which is pivotally attached to the drill frame.

Other objects of the invention will appear hereinafter, the novel features and combinations being set forth in the appended claim.

In the accompanying drawings,

Fig. 1 is a plan view, with certain parts broken away, showing some of the principal parts of a drill mechanism incorporating the features of my invention;

Fig. 2 is an enlarged plan view, with parts broken away and in section, showing particularly the split feed nut and associated feed screw, as well as the operating mechanism for the feed nut;

Fig. 3 is a front view of a portion of the mechanism;

Fig. 4 is a sectional elevational view, showing particularly the feed nut and its operating mechanism as well as a telescoping shield provided for the drill bit; and Fig. 5 is a sectional view taken on the line 5—5 of Fig. 4, looking in the direction of the arrows.

This invention relates to an improvement on the drill mechanism disclosed in the patent to R. K. Jeffrey, No. 2,030,636, dated February 11, 1936, and, except for differences which are described or are obvious, it is to be understood that the drill mechanism in its principal features follows the disclosure of said patent.

Briefly described the drill includes a main frame in the form of a housing 10 which houses an electrical motor and drive gearing, by which a feed screw 11 is rotated at a desired speed and is selectively feedable in reverse directions or may be rotated without feeding, by virtue of a sleeve 12 which may be selectively rotated at a faster or slower speed than, or the same speed as, the speed of rotation of the feed screw 11.

Removably keyed to the outer end of the driving sleeve 12 is a driving head 13 which has a driving relation with a composite split feed nut designated in its entirety by the reference character 14. The feed nut 14 is formed of two similar, though not identical, halves, each of which includes an inner shell 15 which has its interior surface screw threaded and cooperating with the threads on the external surface of the feed screw 11. Rigidly but removably attached to each inner shell 15 is an outer shell 16. A recessed set screw 17 removably attaches the inner and outer shells 15 and 16.

The two halves of the split feed nut 14 are urged to normal feed nut disengaging position by being urged in a rectilinear direction radially outwardly by means of upper and lower coil or helical springs 18, the opposite ends of which are received in appropriate wells in the rear enlarged portions of said outer shells 16, as clearly illustrated in Figs. 2 and 4 of the drawings.

Said two halves of the feed nut 14 are guided in this radial movement by means of the rectilinear guides 19 formed in the driving head 13. Opposite overlapping flanges 20 on said head 13 retain the feed nut thereon while providing for the radial expansion of the two halves thereof. Said radial expansion or disengaging action is limited by a pair of stops, one comprising a pin 21 carried on one side of the head 13 and projecting into the path of one of the halves of feed nut 14, the other comprising a loop 22 carried at the opposite side of head 13, into which a removable pin 23 projects, said removable pin 23 being attached to one of the outer shells 16 by a screw 24 (Fig. 2) and providing for the disassembly of the parts so that the split feed nut 14 may be removed from the driving head 13, whenever occasion warrants.

To provide for contraction of the two halves of the feed nut 14, thereby to effectuate a driving relation between said feed nut and the feed screw 11 against the normal action of the springs 18, the outer surface of the two outer shells 16 is tapered along the axis of the feed nut and feed screw. An actuating collar or sleeve 25, having a similar tapered interior surface, cooperates therewith so that when it is moved rectilinearly to the left, as viewed in Figs. 2 and 4 of the drawings, a camming action will be effectuated on said feed nut halves to move them radially inwardly. Said collar 25 and feed nut halves 16 also preferably have cooperating cylindrical bearing surfaces at opposite ends thereof, as clearly illustrated in Figs. 2 and 4 of the drawings.

The actuating collar or sleeve 25 is provided on opposite sides with radially inwardly extending pins 26 which project between the two halves of the outer shells 16 so that when the actuating collar 25 is moved to the right, as viewed in Figs. 2 and 4, said feed nut halves will be forcibly moved apart in case they should be stuck and not be moved apart by the springs 18. This is effectuated by the camming surfaces 27 (see Fig. 2) provided adjacent the right-hand or forward portions of the outer shells 16.

To provide for rectilinear or axial shifting movement of the collar or sleeve actuator 25 by mechanism which fully protects the operator and at the same time effectuates a very efficient operation, the outer or right-hand cylindrical portion of the sleeve or collar 25 is provided with a ball anti-friction bearing 28, the inner race of which is removably but rigidly attached to said collar or sleeve 25 by a shoulder on the left-hand side and a removable spring locking ring 29 on the right-hand side which fits in a circumferential groove therein. The outer race of the ball bearing 28 is carried in a suitable cage 30 to which said outer race is removably attached by an abutment on one side and a spring locking ring 31 on the opposite side which fits in a circumferential groove.

To provide a lubrication well and dirt and dust seal for the ball bearing 28, raw hide or other seals 32 and 33 are carried at opposite sides of the cage 30 and are held removably therein by appropriate locking rings, the seals cooperating with external cylindrical surfaces of the collar or sleeve 25, as clearly illustrated in the drawings.

The cage 30 is mounted for rectilinear sliding movement on a plurality of cylindrical guides 34 which extend through spaced slide bearings 35 forming a part of the cage 30, said guides 34 being rigidly attached at opposite ends to end plates 36 and 37, which with said guides 34 form a part of the main frame 10 of the drill. A two part removable cover 38 is provided to enclose the mechanism above described, it being attached at its top to a longitudinally extending frame member 39 which extends between the plates 36 and 37, and is rigidly attached to them.

An upwardly projcting operating handle 40 is bifurcated adjacent its bottom and pivotally attached by a pivot pin 41 to the frame member 39, the bottom tines thereof having notches which project over and receive trunnions 42 formed on opposite sides of the cage 30.

It is obvious that by moving the handle 40 forward the collar or sleeve 25 may be shifted rectilinearly rearwardly or axially rearwardly of the feed nut and feed screw, thereby to compress the feed nut halves or move them radially inwardly to effect a driving relation between them and said feed screw 11. Conversely, by moving the handle 40 rearwardly, the feed nut may be disengaged from the feed screw.

The forward end of the feed screw 11 is provided with a socket 43 which removably receives and holds a drill bit 44. To protect the operator I preferably provide a telescoping shield 45 for the drill bit 44 and socket 43, the inner tubular member of which telescoping shield 45 is rigidly attached to the forward end plate 37 of the frame 10.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

A drill including a feed screw adapted to drive a drill bit, a split feed nut associated with said feed screw and having two halves, means for driving said feed nut relative to said feed screw to effect feeding thereof, said feed nut including spring means on opposite sides thereof urging the two halves apart by rectilinear motion, said feed nut driving means including a driving head for said feed nut having guideways providing for opposite radial rectilinear movement of the two halves thereof while preserving the driving relation thereto, operating mechanism for contracting and releasing said feed nut halves including an actuating collar rotatable with said feed nut, a pivoted operating lever for operating said collar, and anti-friction thrust bearing means interconnecting said collar and said lever.

JOHN S. BELTZ.

REFERENCES CITED

The following references are of record in the file of this patent:

UNITED STATES PATENTS

| Number | Name | Date |
| --- | --- | --- |
| 1,688,774 | Anfield | Oct. 23, 1928 |
| 2,353,006 | Beltz | July 4, 1944 |